July 10, 1956
C. N. KIMBERLIN, JR., ET AL
2,754,270
PROCESS FOR THE MANUFACTURE OF SILICA HYDROSOLS
Filed May 7, 1952
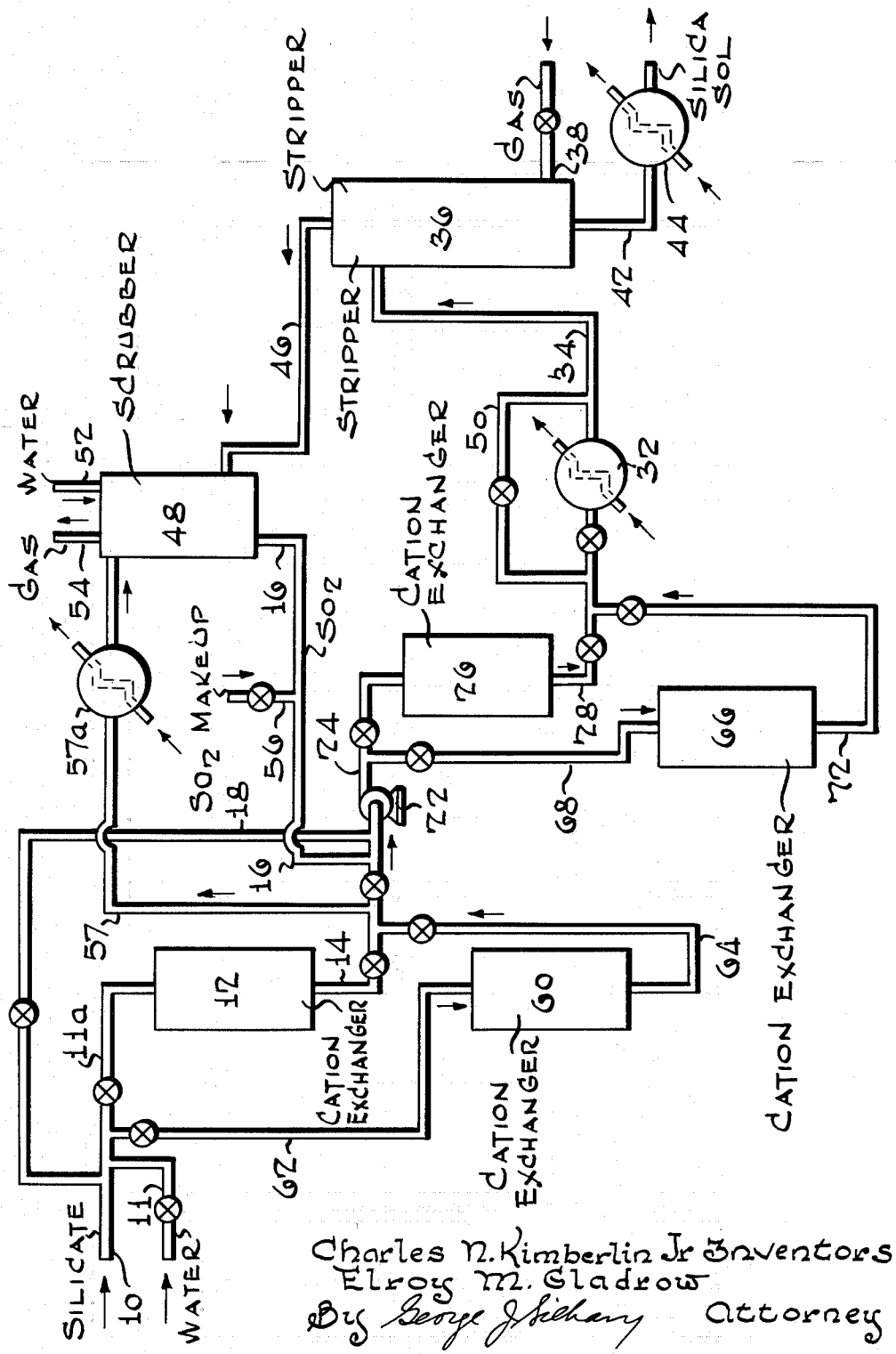
Charles N. Kimberlin Jr. Inventors
Elroy M. Gladrow
By George J. Hickey Attorney

United States Patent Office 2,754,270
Patented July 10, 1956

2,754,270

PROCESS FOR THE MANUFACTURE OF SILICA HYDROSOLS

Charles N. Kimberlin, Jr., and Elroy M. Gladrow, Baton Rouge, La., assignors to Esso Research and Engineering Company, a corporation of Delaware Application May 7, 1952, Serial No. 286,644

7 Claims. (Cl. 252—313)

This invention relates to an improved process for the preparation of substantially pure inorganic oxide hydrosols by using cation exchange materials.

It is known to produce silica hydrosols by passing dilute sodium silicate solutions in contact with cation exchange materials. In the prior art processes used to produce dilute silica hydrosols, the useful life of the cation exchange material is reduced after some use and is substantially reduced when producing silica hydrosols of above about 3% silica content. In some cases there may be a deposition of silica gel in or on the surfaces of the exchange material and this results in a loss of exchange capacity and/or exchange rate.

The rate of polymerization of silica is influenced to a great extent by the pH of the environment. In particular the polymerization of silica or the gelling of silica hydrosol is very fast in a pH region of about 5 to 8.5. Now in the prior art processes where alkaline sodium silicate solution is percolated through an acid regenerated cation exchange resin or like material to produce an acidic silica hydrosol, it is believed that the liquid material being treated passes rather slowly through this critical pH range or region of about 5 to 8.5 in which the polymerization of silica is very rapid. It is believed that this is one of the reasons for the deposition of silica on the cation exchange material and the loss of exchange capacity when producing more highly concentrated silica hydrosols of above about 3% silica content by the prior art process. The rate of polymerization at a given pH is roughly proportional to the concentration of the silica in the silica hydrosol; thus with dilute hydrosols such as those containing about 3% silica or less the rate of polymerization is sufficiently low even while passing through the critical pH region as to permit direct treatment of sodium silicate with an acid regenerated cation exchanger for production of the dilute hydrosol by the prior art process. The present invention avoids the deposition of silica on the exchange material when producing more highly concentrated silica hydrosols by utilizing a plurality of cation exchange beds and adding an acid between stages to avoid the critical pH region.

According to the present invention dilute aqueous alkali metal silicate solution is contacted with a bed of cation exchange material in its hydrogen form to remove alkali metal ions and to produce a dilute substantially pure silica hydrosol having a concentration of about 3% silica by weight. Stable 3% silica hydrosols are obtained in this step by using strong acid exchange resins without the addition of extraneous acid. Then an acid such as sulfurous acid or sulfur dioxide is added to the dilute silica hydrosol and an additional amount of more concentrated aqueous alkali metal silicate is added and this mixture is then passed through a second bed of cation exchange material to produce a more highly concentrated substantially pure silica hydrosol having a silica content of about 6 to 10% by weight. One of the preferred acids is sulfurous acid or $SO_2$ which is selected because it has about the desired degree of acidity and it can be removed from the finished silica hydrosol and recovered for reuse in the process. However, other acids may be used.

Silica deposition on the cation exchange material in the manufacture of more highly concentrated silica hydrosols is prevented in the present invention by the process of first forming a dilute silica hydrosol by ion exchange with dilute sodium silicate by means known to the prior art and then mixing this silica hydrosol with an acid such as sulfurous acid and adding an additional amount of more concentrated sodium silicate followed by contacting with a cation exchange resin to remove soda and produce a soda-free high silica content hydrosol. In this manner fouling of the resin in the first exchange zone is avoided by using only dilute silicate solution in this zone, fouling of the resin in the second exchange zone is avoided by maintaining the pH in this zone at all times below the critical value for silica polymerization.

More particularly according to this invention more highly concentrated substantially pure silica hydrosols are obtained by mixing acidic silica hydrosol with an aqueous solution of alkali metal silicate and an excess of acid such as sulfurous acid or other acid to form a silica hydrosol containing an excess of acid as well as sodium sulfite and/or sodium bisulfite when sulfurous acid is used. The entire acid treated mixture containing the silica hydrosol is then contacted with or percolated through the second bed of acid regenerated cation exchange material to effect essentially complete removal of the sodium or other alkali metal ion from the mixture. During the contacting with the cation exchange material the sodium sulfite and/or sodium bisulfite is decomposed by absorption of the sodium by the cation exchange material and liberation of the sulfurous acid to produce an acid silica hydrosol containing only sulfurous acid and silica.

The acid silica hydrosol withdrawn from the second bed of cation exchange material is then introduced into a distillation zone or other separation zone where sulfur dioxide is distilled overhead or otherwise removed and recovered for reuse in the process and purified acid silica hydrosol free of sulfurous acid is recovered as a separate stream. Instead of distilling, the sulfur dioxide may be removed from the acid silica hydrosol by blowing with air or inert gas such as natural gas in a tripping zone and then recovering the sulfur dioxide as sulfurous acid by scrubbing with water or dilute silica hydrosol or as sulfur dioxide by adsorption with an adsorbent such as charcoal. If it is desired to minimize the temperature to which the silica hydrosol is subjected in the distillation zone the distillation may be carried out under vacuum or subatmospheric pressures.

In the process of this invention it is essential that the mixture of aqueous alkali metal silicate, acid silica hydrosol and the added acid be on the acidic side and that there is an excess of acid present above that required for neutralization of the alkali metal silicate. Preferably, the pH of the acid mixture should be between about 1 and 4.

In the drawing:

The figure represents one form of apparatus adapted to carry out the present invention.

Referring now to the drawing the reference character 10 designates a line through which sodium silicate solution or other alkali metal silicate solution is passed. The alkali metal silicate solution has a concentration of about 6% to 20% silica by weight. Solutions of the commercial water glasses such as that having a composition represented by the formula $Na_2O \cdot 3.25SiO_2$ are suitable. Water is introduced by line 11 to dilute the alkali metal silicate solution to a concentration of not more than about 3% silica content by weight. The dilute alkali metal silicate solution is introduced by line 11$a$ into the cation exchange material zone 12 where the mixture is contacted with a granular acid regenerated cation exchange resin or other exchange material arranged as a substantially stationary vertical column. The flow of the dilute alkali metal silicate solution may be downward or upward in zone 12.

In the exchange material zone 12 sodium or other alkali metal ions are removed and the effluent from zone 12 is a substantially pure silica hydrosol having a concentration of not more than about 3% silica. The effluent from exchange material zone 12 passes through line 14 and has added to it sulfurous acid, sulfur dioxide or other acid through line 16. In order to produce a more highly concentrated silica hydrosol an additional amount of the more concentrated aqueous alkali metal solution from line 10 is passed through line 18 and mixed with the acid silica hydrosol containing the added sulfurous acid or other acid. This mixing is preferably done rapidly and the rapid and thorough mixing may be obtained by a centrifugal pump 22 or any other suitable means. If a centrifugal pump is used the impeller causes rapid mixing of the aqueous alkali metal silicate solution from line 18 with the acidic silica hydrosol and sulfurous acid passing through line 14 into the pump 22. In place of mixing within the pump the mixing may be brought about in line 14 by means of suitable restrictions such as Venturi orifices. The temperature in the mixing zone should be maintained below about 120° F., preferably below about 80° F.

The resulting mixture which contains an acid silica hydrosol, an excess of sulfurous acid and sodium sulfite and/or sodium bisulfite has a pH of about 1 to 4 and this mixture is then passed through line 24 and then through a second cation exchange bed of material in zone 26. The exchange material is the same type of exchange material contained in zone 12. The exchange material is in granular form and is maintained as a substantially stationary vertical column.

In the exchange material zone 26 sodium or other alkali metal ions are removed and the effluent from zone 26 is a substantially pure silica hydrosol containing sulfurous acid. The silica hydrosol has a concentration of silica of about 4 to 10% by weight or higher, preferably 6 to 10%. In passing through the zone 26 of exchange material the sodium ions from the sodium bisulfite or sodium sulfite are removed and sulfurous acid is regenerated. The effluent from exchange material zone 26 passes through line 28 and heater 32 where the acid solution of the silica hydrosol is heated to a temperature of about 120°–170° F. and the heated solution is then passed through line 34 and introduced into the upper portion of a stripping tower 36 which is maintained at substantially the same temperature. Air or inert gas such as natural gas is introduced into the lower portion of the stripping tower 36 through line 38 to remove sulfur dioxide from the silica hydrosol and the gas and sulfur dioxide are taken overhead through line 46 and introduced into the bottom portion of a scrubbing tower 48.

Particularly when producing higher concentration hydrosols of say about 8% silica content it may be desired to avoid heating of the hydrosol in order to minimize the degree of polymerization of the silica. In this case the hydrosol in line 28 bypasses the heater 32 via line 50 and the heat required to vaporize the sulfur dioxide from the hydrosol is supplied by heating the stripping gas entering stripping zone 36 via line 38. In this manner the stripping of the sulfur dioxide may be accomplished while maintaining the temperature of the silica hydrosol below about 120° F.

Instead of using the stripping zone 36 the effluent from the cation exchange material bed 26 may be passed to a distillation zone (not shown) to distill overhead the sulfur dioxide and recover it for reuse while withdrawing purified acidic silica hydrosol free of sulfurous acid as a bottoms stream. This distillation can be carried out under superatmospheric pressures to minimize the temperature during distillation. Instead of recovering the sulfur dioxide by scrubbing with water or with the dilute silica hydrosol from exchange zone 12, it may be adsorbed with an adsorbent such as charcoal and then recovered for reuse.

The silica hydrosol withdrawn from the bottom of the stripping zone or tower 36 is passed through line 42 and cooler 44 and is then passed to storage or is used in any other desired manner. The silica hydrosol withdrawn through line 42 from which excess acid has been removed sets to a silica hydrogel in a relatively short time. Cooler 44 may be omitted, if desired, particularly if it is planned to convert the silica hydrosol product into a silica hydrogel for use as a hydrogel in the manufacture of adsorbents or catalysts or the silica hydrogel may be dried to form silica gel. The liquid withdrawn through line 42 from the bottom of the stripping tower 46 comprises substantially pure silica hydrosol having a concentration of silica of about 4 to 15% by weight and containing less than about 0.1% by weight $Na_2O$ on a dry basis.

Returning now to the scrubbing tower 48 the gaseous overhead from the stripping tower 36 passing through line 46 is introduced into the bottom portion of the scrubber 48 where the gases are contacted with water introduced into the top of the scrubber 48 through line 52. Air or other inert gas substantially free of sulfur dioxide is withdrawn from the top of the scrubber 48 through line 54. A water solution of sulfurous acid or sulfur dioxide is withdrawn from the bottom of the stripping tower and passed through line 16 for reuse in the process as above described. Makeup sulfurous acid or $SO_2$ in anhydrous form, as a gas or in aqueous solution is introduced into line 16 through line 56. As an alternative and preferred procedure the dilute silica hydrosol from exchange zone 12 may replace all or a part of the scrubbing water in scrubbing zone 48. For this purpose silica sol from exchange zone 12 is introduced by lines 14 and 57 and cooler 57a into scrubber 48 at or near the top of the scrubber. Cooler 57a serves to cool the silica sol used as scrubbing medium to a temperature below about 80° F., preferably below about 50° F., and thus increases its capacity for absorbing sulfur dioxide. The silica sol in scrubber 48 absorbs the sulfur dioxide from the gases introduced by line 46. The silica sol containing dissolved sulfur dioxide leaves scrubber 48 by line 16. By thus using silica sol as the scrubbing medium dilution of the sol product by scrubbing water may be avoided.

In order to obtain efficient scrubbing of the sulfur dioxide it is desirable to maintain the concentration of free or uncombined sulfur dioxide or sulfurous acid in the scrubbing liquid in tower 48 well below its saturation value. This may be accomplished by operating the scrubbing tower 48 at a relatively low temperature below 80° F., preferably below 50° F. and of at least about 10 to 1, preferably 15 to 1 by weight of water or silica sol scrubbing medium to sulfur dioxide.

The aqueous solution containing sulfurous acid or $SO_2$ withdrawn from the bottom of the scrubber 48 is passed through line 16 as above described and mixed with the silica sol solution passing through line 14 from the first cation exchange zone 12. Then the mixture is further mixed with an aqueous alkali metal silicate solution containing from 6 to 20% by weight of silica. The excess sulfurous acid introduced through line 16 reacts with the alkali metal silicate introduced through line 18 and converts it into silica hydrosol and sodium sulfite and/or sodium bisulfite. This mixture which has a pH below about 5 is then passed through the second cation exchange zone 26 as above described. It is important that the amount of sulfur dioxide introduced by line 16 be at least stoichiometrically equivalent to the soda content of the sodium silicate introduced by line 18. In calculating the stoichiometric equivalence sulfur dioxide is considered as a monobasic acid. For example, when introducing a sodium silicate solution of composition $Na_2O \cdot 3.25 SiO_2$ by line 18 the sulfur dioxide introduced by line 16 should be about 0.70 lb. of $SO_2$ per pound of $SiO_2$ in the sodium silicate introduced by line 18. A larger amount of sulfur dioxide is not particularly harmful, but does no good. On the other hand a much smaller amount of sulfur dioxide (less than about 0.65 lb. of $SO_2$ per lb. of $SiO_2$) will result in gel formation in the subsequent exchange treatment in zone 26 thus causing damage to the exchange resin.

In actual practice more than one cation exchange zone 12 is used in the first step and more than one cation exchange zone 26 is used for the second step so that one bed of exchange material will be on the regeneration step while another or other beds of exchange material are in the exchange step or washing steps. In the first stage another exchange vessel is shown at 60 having an inlet line 62 and an outlet line 64. In the second stage another cation exchange vessel 66 is provided having an inlet line 68 and an outlet line 72. It is to be understood that any number of cation exchange material beds may be used.

As the cation exchange material there is preferably used a resin of the acid regenerated cation type. Such cation exchange resins are available as commercial products. The exchange resins are obtained by condensing aldehydes such as formaldehyde with certain phenolsulfonic acids or the like. Other exchange materials which may be used are sulfuric acid treated coal or wood or waste petroleum sludge or lignite or the like. Also the sulfonated polystyrene type exchange resin may be used. These exchange materials are treated with an acid such as sulfuric acid or hydrochloric acid to put them in the hydrogen cycle for use in removing cations or sodium ions in this particular case. Exchange resins of this type are sold by Resinous Products and Chemical Company under the name of Amberlite. One of the strong acid ion exchangers is Amberlite IR-120.

After the cation exchange material has been used for some time the exchange capacity decreases due to the accumulation of sodium ions thereon and it is then necessary to regenerate the exchange material. It is necessary to regenerate whenever the sodium content of the effluent from the resin bed exceeds that desired in the final hydrosol product. This may be determined by various instrumental means which depend upon the electrical conductivity, pH or other property of the hydrosol effluent from the exchange zone. However, for practical purposes it is usually preferred to predetermine the capacity of the particular exchange resin being used for soda removal. This is best done for exchange zone 12 in a small experimental exchange resin bed to which is fed sodium silicate having a composition the same as that in line 11a. The effluent from the experimental bed is collected in increments which are separately analyzed for soda. The data thus obtained may be used to calculate the total volume of sodium silicate that may be processed in exchange resin bed 12 per exchange step to obtain an essentially soda free hydrosol. In like manner the exchange capacity of exchanger 26 may be determined by means of a small experimental resin bed to which is fed a mixture of silica hydrosol containing sulfurous acid and sodium sulfite and/or bisulfite having a composition the same as that in line 24.

Usually about 10% less than this calculated volume is processed per exchange cycle in order to allow a reasonable safety factor against sodium breakthrough into the hydrosol product. This volume of hydrosol that may be processed in exchange resin bed 12 per exchange cycle is, of course, dependent upon several factors such as (1) the nature or exchange capacity of the particular resin being employed, (2) the concentration of the particular sodium silicate solution being processed and (3) the soda to silicate ratio in the sodium silicate entering the process through line 10.

After percolation of the required volume of hydrosol through exchange resin bed 12, the hydrosol remaining in the bed is first displaced with water and the bed rinsed with water preparatory to regeneration. Only about 1 to 2 volumes of water per volume of resin are required for displacing the hydrosol and rinsing the resin bed.

The exchange resin bed is then regenerated with an acid such as sulfuric acid or hydrochloric acid to replace the alkali metal ions on the resin with hydrogen ions with the formation of sodium sulfate or sodium chloride depending on the acid used in the regeneration. The regenerating acid may be conveniently used as a solution having a concentration of 5 to 10%. The amount of regenerating acid used per regeneration step may be related to the amount of soda removed from the hydrosol by the resin during the exchange cycle. In general, a considerable excess of regenerating acid over that stoichiometrically equivalent to the soda is required in order to obtain efficient regeneration; thus the total amount of acid used in the regeneration cycle may be 125 to 200% of the stoichiometric equivalent of the soda deposited upon the resin during the exchange cycle. After regeneration the bed of exchange material is washed with water until the effluent tests free of sulfate ion or chloride ion depending on the type of acid used. Two to five volumes of water per volume of resin may be used for this wash. The cation exchange material is then ready for another cation exchange operation.

The concentration of the sulfur dioxide in the water solution withdrawn from the bottom of the scrubber 48 will be not more than about 10% by weight. The rate of flow and the concentration of sodium silicate solution or other alkali metal silicate solution passing through line 18 and the rate of flow of solution of sulfur dioxide passing through line 16 are so adjusted that the sulfur dioxide is in stoichiometric excess of the sodium silicate. In this case for making calculations of stoichiometric equivalence the sulfur dioxide should be considered as a monobasic acid. The excess of sulfur dioxide over that calculated stoichiometrically need be only about 5 to 10% although a greater excess may be used. For example when using a sodium silicate solution having a soda to silica ratio represented by the formula $$Na_2O \cdot 3.25 SiO_2$$

about 0.7 lb. of sulfur dioxide per lb. of silica is required, although a larger amount of sulfur dioxide may be employed if desired.

The rate of flow of the sodium silicate solution through the bed of cation exchange material 12 may vary between about 0.1 to 1 gallon per minute per cubic foot of resin, preferably about 0.35 gallon per minute per cubic foot of resin. This rate of flow will depend somewhat upon the particular exchange resin material employed since some of the available resins permits more rapid exchange than others. The preferred rate above given applies to strong acid cation exchangers. The rate of flow of the silica-containing solution from line 24 through the bed of cation exchange material in zone 26 is the same as that just given for the rate of flow of the sodium silicate solution through the first cation exchange material in zone 12.

Instead of using sulfurous acid or sulfur dioxide any other volatile acid may be used which is sufficiently acidic to give the desired pH of the silica hydrosol and which can be distilled overhead or otherwise removed from an aqueous solution. Instead of using sulfurous acid other acids such as acetic acid, propionic acid or chloroacetic acid may be used which may be recovered from the acid silica hydrosol by solvent extraction with a solvent such as chloroform or a hydrocarbon oil.

The silica hydrosol may be allowed to gel and the silica gel may be used as such or the silica hydrosol may be mixed with alumina hydrosol in the preparation of catalysts such as cracking catalysts. In such catalysts it is essentially to have them substantially soda free and the use of a substantially soda free silica hydrosol prepared according to the present invention results in such improved catalysts. The silica hydrosol and alumina hydrosol may be mixed in any desired proportion from 10 to 90% of silica and the rest alumina and the resulting hydrosol mixture may be gelled and dried or spray dried to form spherical particles. The catalyst may be in the form of granules, powder or spherical particles. The silica hydrosol or gel made therefrom may be impregnated with a large variety of other catalytic agents other than alumina to produce useful catalysts. For example, impregnation with magnesia leads to a cracking catalyst of another type, or the addition of nickel, platinum or molybdenum oxide leads to hydrogenation or reforming catalysts. The silica hydrosol may also be employed as an impregnating agent to add small amounts of silica to other catalysts or catalyst bases; for example, treatment of alumina with sufficient silica hydrosol to deposit 0.5 to 5% silica improves the alumina for use as a reforming catalyst base. The silica hydrosol may also be employed as an impregnating agent to add silica to such materials as fabrics or paper. The silica hydrosol may also serve as a source of very pure silica for the production of silica gel base greases.

The silica gel produced from the silica hydrosol made by the present process needs no water washing to remove impurities or water soluble material.

By using the present invention it is possible to obtain a substantially pure silica hydrosol containing up to about 15% $SiO_2$ by weight and as little as 10 parts per million of soda by weight without depositing a detectable amount of silica on the exchange resin or other exchange material or without impairing the usefulness of the exchange resin or other material for further exchange after regeneration with an acid.

The production of a purified silica sol containing about 80 grams of silica per liter will be described. A diluted sodium silicate solution is prepared by diluting a stronger sodium silicate ($Na_2O \cdot 3.25SiO_2$) solution of specific gravity 1.21 with 5.9 times its volume of water. The diluted sodium silicate solution is passed through a bed of acid regenerated cation exchange resin (Amberlite IR–120) at a temperature of about 70° F. and a flow rate of about 0.3 gallon per minute per cubic foot of resin and a total flow of about 4 volumes of dilute sodium silicate solution per volume of resin bed. The effluent dilute silica sol containing about 30 grams of silica per liter or about 3% $SiO_2$ by weight is cooled to a temperature below about 40° F. and used as an absorbent to absorb anhydrous sulfur dioxide gas. The amount of sulfur dioxide absorbed is about 57 grams per liter of dilute sol. To each liter of the chilled dilute sol containing sulfur dioxide is now added about 390 cc. of strong sodium silicate solution of sp. gr. 1.21. The mixture is then percolated through a bed of acid regenerated cation exchange resin (Amberlite IR–120) at a flow rate of about 0.3 gallon per minute per cubic foot of resin and a total flow of about 2 volumes per volume of exchange resin bed. The effluent is stripped of sulfur dioxide by blowing with natural gas at about 100° F. for about 30 minutes. The product sol contains about 80 grams of silica per liter or about 8% $SiO_2$ by weight and is essentially free of soda and sulfurous acid.

It has been possible to prepare substantially soda free 7% and 10% silica hydrosols according to the present invention repeatedly reusing the same exchange resin bed with acid regeneration without loss in cation exchange resin capacity or silica gel deposition on the resin. With silica hydrosols of higher concentration, above about 10%, sulfur dioxide tends to come out of solution during the percolation step in cation exchange zone 26 with the formation of gas bubbles in the exchange resin bed thus causing some loss of efficiency in the percolation. This may be avoided by conducting the operation under a superatmospheric pressure of about 5 to 100 lbs. per square inch.

As above pointed out, in the mixture passing through line 24 to the second exchange zone 26, the sulfur dioxide acts as a monobasic acid so that a minimum of about 0.7 lb. sulfur dioxide is required per lb. of silica when using a sodium silicate of ratio $Na_2O \cdot 3.25SiO_2$ and the sulfur dioxide is recovered for reuse.

Instead of using stationary beds of cation exchange material, the exchange material may be mixed as a slurry in a stirred mixer or in an agitator type vessel during the ion exchange stpes.

What is claimed is:

1. A process for the production of silica hydrosol which comprises contacting a dilute aqueous solution of an alkali metal silicate containing no more than about 3% silica by weight with a substantially stationary bed of granular acid cation exchange material in the hydrogen form to produce a dilute silica hydrosol solution, rapidly and thoroughly mixing sulfurous acid and an additional amount of an aqueous solution of an alkali metal silicate more concentrated than that used in said first exchange step with a portion of the dilute silica hydrosol solution from said first exchange step and contacting the resulting mixture with a second substantially stationary bed of granular cation exchange material in the hydrogen form while maintaining the pH below about 5.0 to remove alkali metal ions from said mixture and to produce a more highly concentrated silica hydrosol solution containing more than about 3% silica by weight and substantially free of alkali metal ions, passing the more concentrated silica hydrosol solution to a separation zone and removing $SO_2$ gas overhead from said separation zone, recovering the more concentrated silica hydrosol solution substantially free of sulfurous acid from the bottom of said separation zone, recovering removed $SO_2$ in a recovery zone by scrubbing it with another portion of the dilute silica hydrosol from said first exchange step and then using the last-mentioned silica hydrosol with the sulfurous acid as part of the feed to said second exchange step.

2. A process for the production of silica hydrosol which comprises contacting a dilute aqueous solution of an alkali metal silicate containing no more than about 3% silica by weight with a substantially stationary bed of granular acid cation exchange material in the hydrogen form to produce a dilute silica hydrosol solution, mixing sulfurous acid and an additional amount of an aqueous solution of an alkali metal silicate more concentrated than that used in said first exchange step with dilute silica hydrosol solution from said first exchange step and contacting the resulting mixture with a second substantially stationary bed of granular cation exchange material in the hydrogen form while maintaining the pH below about 5.0 to remove alkali metal ions from said mixture to produce a more highly concentrated silica hydrosol solution containing more than about 3% silica by weight and substantially free of alkali metal ions, passing the more concentrated silica hydrosol solution to a separation zone to volatilize $SO_2$ from the more concentrated silica hydrosol solution and removing $SO_2$ overhead from said separation zone, recovering the more concentrated silica hydrosol solution substantially free of sulfurous acid from the bottom of said separation zone, recovering volatilized $SO_2$ in water as sulfurous acid and then using the sulfurous acid as the acid to be mixed with the mixture passing to the second exchange step.

3. A process for the production of silica hydrosol which comprises contacting in the absence of added acid a dilute aqueous solution of an alkali metal silicate containing no more than about 3% silica by weight with a substantially stationary bed of granular acid cation exchange material in the hydrogen form to produce a dilute silica hydrosol solution, mixing sulfurous acid and an additional amount of an aqueous solution of an alkali metal silicate more concentrated than that used in said first exchange step with dilute silica hydrosol solution from said first exchange step and contacting the resulting mixture with a second substantially stationary bed of granular cation exchange material in the hydrogen form while maintaining the pH below about 5.0 to remove alkali metal ions from the mixture and to produce a more highly concentrated silica hydrosol solution containing more than about 3% silica by weight and substantially free of alkali metal ions, passing the more concentrated silica hydrosol solution to a separation zone to volatilize $SO_2$ from the more concentrated silica hydrosol solution and removing $SO_2$ overhead from said separation zone, recovering the more concentrated silica hydrosol solution substantially free of sulfurous acid from the bottom of said separation zone, recovering the $SO_2$ and using it as the acid introduced into said mixture passing to said second exchange step.

4. A process for the production of silica hydrosol which comprises contacting in the absence of added acid a dilute aqueous solution of an alkali metal silicate containing no more than about 3% silica by weight with a substantially stationary bed of granular acid cation exchange material in the hydrogen form to produce a dilute silica hydrosol solution, mixing sulfurous acid and an additional amount of an aqueous solution of an alkali metal silicate more concentrated than that used in said first exchange step with dilute silica hydrosol solution from said first exchange step and contacting the resulting mixture with a second substantially stationary bed of granular cation exchange material in the hydrogen form while maintaining the pH below about 5.0 to remove alkali metal ions from the mixture and to produce a more highly concentrated silica hydrosol solution containing more than about 3% silica by weight and substantially free of alkali metal ions, and passing the more concentrated silica hydrosol solution to a separation zone to volatilize $SO_2$ from the more concentrated silica hydrosol solution and removing $SO_2$ overhead from said separation zone, and recovering concentrated silica hydrosol solution substantially free of sulfurous acid from the bottom of said separation zone.

5. A process for the production of silica hydrosol which comprises contacting in the absence of added acid a dilute aqueous solution of an alkali metal silicate containing no more than about 3% silica by weight with a substantially stationary bed of granular acid cation exchange material in the hydrogen form to produce a dilute silica hydrosol solution, then mixing sulfurous water soluble acid and an additional amount of an aqueous solution of an alkali metal silicate more concentrated than that used in said first exchange step with dilute silica hydrosol solution from said first exchange step and contacting the resulting mixture with a second substantially stationary bed of granular cation exchange material in the hydrogen form while maintaining the pH below about 5.0 to remove alkali metal ions from said mixture and to produce a more highly concentrated silica hydrosol solution containing more than about 3% silica by weight and substantially free of alkali metal ions and recovering a relatively concentrated silica hydrosol solution containing more than about 3% silica by weight as a product.

6. A process for the production of silica hydrosol which comprises contacting in the absence of added acid a dilute aqueous solution of an alkali metal silicate containing no more than about 3% silica by weight with a substantially stationary bed of granular acid cation exchange material in the hydrogen form to produce a dilute silica hydrosol solution, then mixing sulfurous acid and an additional amount of an aqueous solution of an alkali metal silicate more concentrated than that used in said first exchange step with dilute silica hydrosol solution from said first exchange step and contacting the resulting mixture with a second substantially stationary bed of granular cation exchange material in the hydrogen form while maintaining the pH below about 5.0 to remove alkali metal ions from said mixture and to produce a more highly concentrated silica hydrosol solution containing more than about 3% and up to about 10% silica by weight and substantially free of alkali metal ions, and recovering a relatively concentrated silica hydrosol solution containing more than about 3% silica by weight, passing said relatively concentrated silica hydrosol solution to a separation zone to volatilize $SO_2$ therefrom and removing $SO_2$ overhead from said separation zone to produce a concentrated silica hydrosol solution substantially free of sulfurous acid and recovering more highly concentrated silica hydrosol solution from the bottom of said separation zone.

7. A process according to claim 6 wherein the alkali metal silicate comprises sodium silicate of a ratio of $Na_2O \cdot 3.25SiO_2$ and the amount of $SO_2$ used for admixture with said more concentrated solution of alkali metal silicate is not less than about 0.7 lb. of $SO_2$ per pound of $SiO_2$.

References Cited in the file of this patent

UNITED STATES PATENTS

| 2,573,743 | Trail | Nov. 6, 1951 |
| 2,588,389 | Iler | Mar. 11, 1952 |
| 2,708,186 | Kimberlin et al. | May 10, 1955 |